March 30, 1926.  1,579,024
F. T. O GRADY
METHOD OF AND APPARATUS FOR MOTION PICTURE PROJECTION
Filed Dec. 12, 1923    2 Sheets-Sheet 1
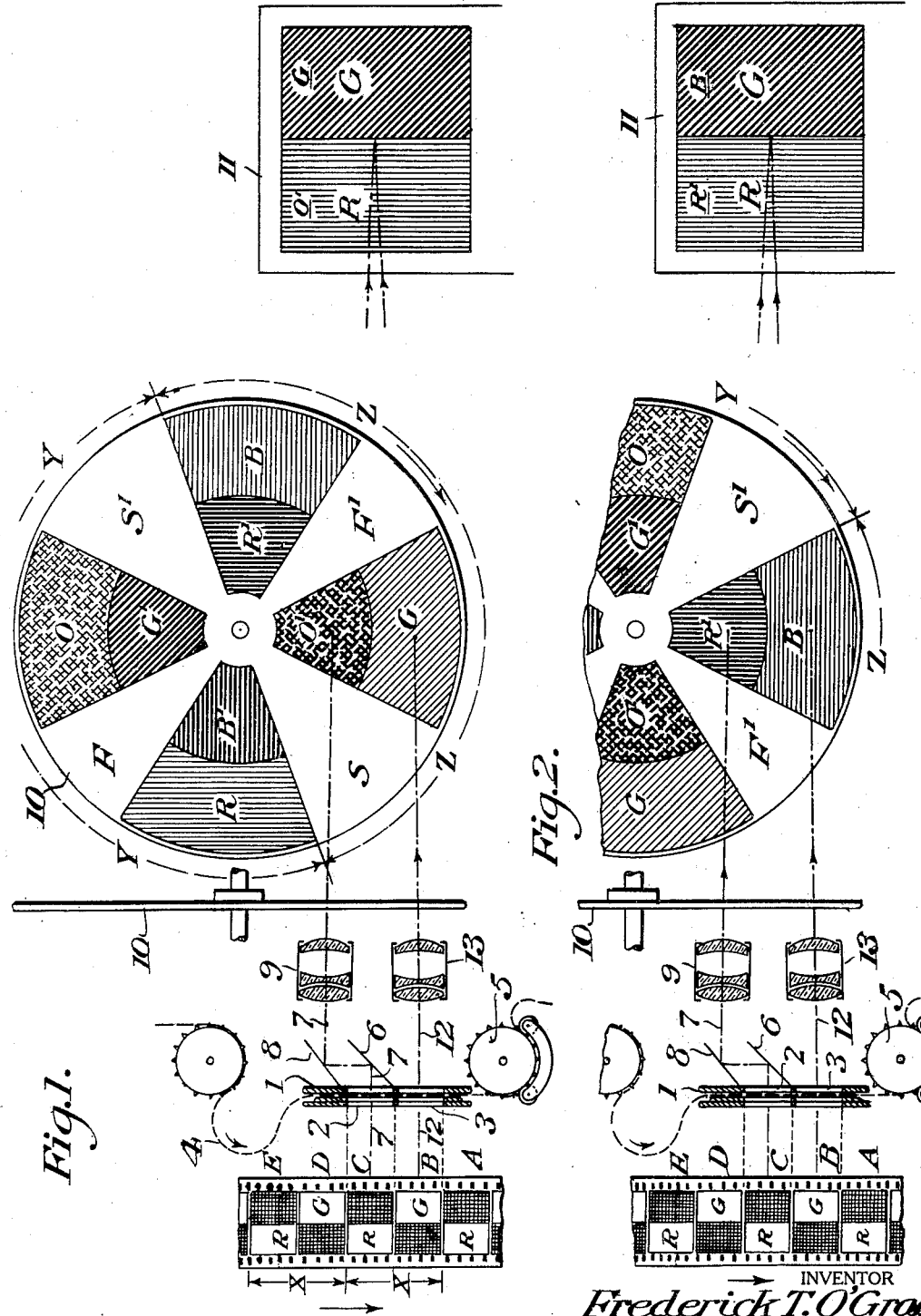
INVENTOR
Frederick T. O'Grady
BY
ATTORNEYS March 30, 1926.
F. T. O'GRADY
1,579,024
METHOD OF AND APPARATUS FOR MOTION PICTURE PROJECTION
Filed Dec. 12, 1923   2 Sheets-Sheet 2
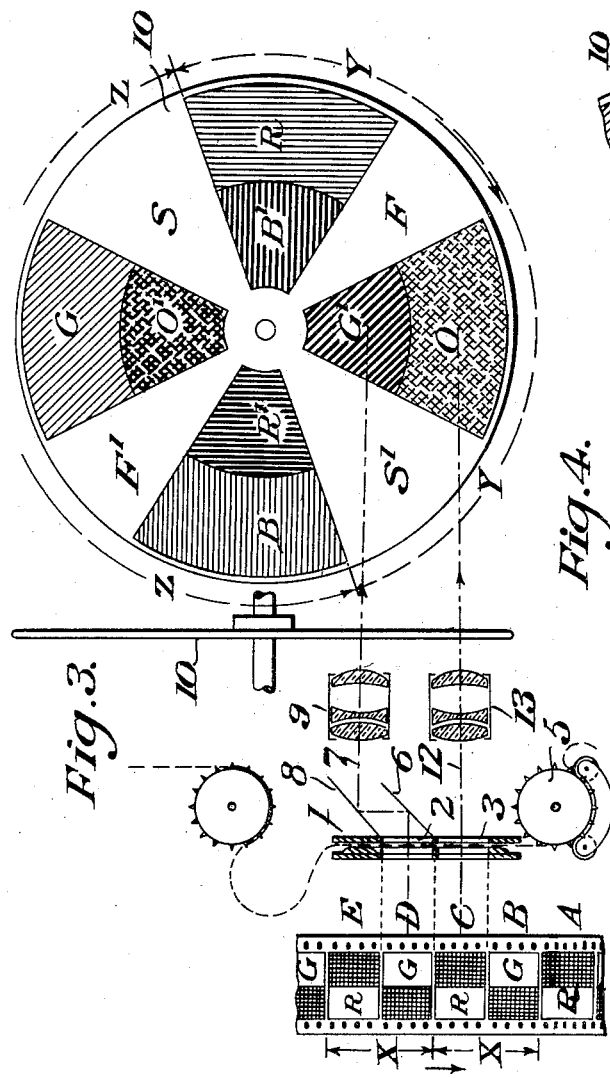
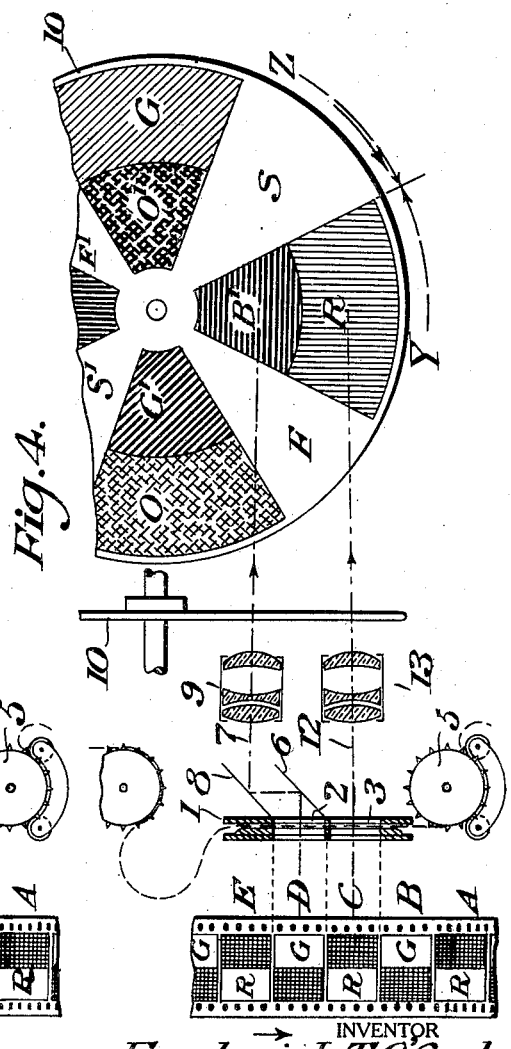
INVENTOR
*Frederick T. O'Grady*
BY
*Daniel Davis*
ATTORNEYS Patented Mar. 30, 1926.

1,579,024

UNITED STATES PATENT OFFICE.

FREDERICK T. O'GRADY, OF FLUSHING, NEW YORK, ASSIGNOR TO HELEN VOGT O'GRADY, OF FLUSHING, LONG ISLAND, NEW YORK.

METHOD OF AND APPARATUS FOR MOTION-PICTURE PROJECTION.

Application filed December 12, 1923. Serial No. 680,135.

*To all whom it may concern:*

Be it known that I, FREDERICK T. O'GRADY, a citizen of the United States, and resident of Flushing, in the county of Queens and State of New York, have invented certain new and useful Improvements in Methods of and Apparatus for Motion-Picture Projection, of which the following is a specification.

One of the important objects of this invention is to provide a method of motion picture projection wherein a group, or plurality, of successively photographed pictures of a series will be simultaneously projected and superimposed on a viewing screen, and the picture images will be so moved through the projecting apparatus that each picture image will be projected on the screen a plurality of times, each projected group containing at least one picture image of the preceding group.

When applied to color motion picture projection the important objects of this invention are to produce motion pictures in substantially the natural colors of the original objects or scenes photographed; to eliminate color pulsation; and to greatly reduce the speed of projection. These objects are attained by a new method of projection embodying a combination of the optical illusion and superimposition methods of color motion picture photography.

In previous well known methods of exhibiting motion pictures in colors, it has been customary to employ either two or more of the primary colors, in such a manner that successive pictures on the film represents the respective color components of the objects or scenes photographed. By the rapid projection of these pictures through color screens corresponding to the respective color records, the effects of superimposition and blending of color is obtained, giving the observer the illusion of pictures in approximately natural colors.

By these methods it has been proposed to photograph and exhibit two or more pictures in rapid succession, through color screens, each of these pictures passing only one of the primary colors. Owing to the varying color values of the alternate pictures and the violent light changes caused by these varying color value pictures, it is necessary to project such films at such a speed, usually about thirty-two pictures per second, so as to prevent as near as possible, the observance of the change from one color value picture to another. In spite of this increased speed of projection, the change from one color picture to another is still greatly discernable, causing what is known as color pulsation. This color pulsation arises from the alternate color value images, in which the separate color value records are represented by transparent and opaque portions, so that where a red object would appear transparent in the picture record of red values, it would appear opaque in the next picture record of green color values. Likewise, where a green object appears transparent in one picture, it appears opaque in the next, so that upon the projection of these varying color picture records, there is a decided pulsation caused from the changes from light to darkness. This pulsation is so greatly discernable as to cause considerable eye strain to the observer.

With my invention a marked advance in reproducing the natural shades and tones of color, with the aid of rotating color screens or filters, in combination with a novel form of double projection, is obtained. This method is adapted to color processes in which, on a single film strip is recorded successive color groups of images, each image in each color group representing a selective color record. By the term "color group" is meant the number of exposures necessary to obtain one complete image in approximately natural colors.

My present invention will be clearly understood from the following description taken in connection with the accompanying drawings. In order to simplify the description and drawings, the process is shown and described as carried out in two colors, red and green. It will, of course, be understood, however, that the process may be equally well adapted to the three, four or more, color processes if desired.

In the drawings:

Fig. 1 is a diagrammatic view of a film and apparatus for carrying out the invention, the film and color filters being in what may be termed the first position;

Fig. 2 a diagrammatic view similar to Fig. 1, with the film in the same position and the color filter moved to the second position;

Fig. 3 a view similar to Fig. 2, with the film moved one picture area to the second position and the color filters moved to the third position;

Fig. 4 a view similar to Fig. 3, with the film in the same position and the color filters moved to the fourth position.

In the drawings is shown a portion of a positive film representing a series of successive pictures taken by the use of a motion picture camera. The pictures represent a red and a green square arranged side by side and the successive pictures are indicated as having been taken alternately through a red and a green color filter. 4 designates the positive film. X designates a color group of two color records. A—B—C and D designate successive pictures taken alternately through red and green color filters. The blank spaces marked R in the picture areas A and C indicate the color record of the red square taken through a red filter, and the dark spaces in said picture areas indicate that no light rays from the green square passed to the negative through the red color filter. The blank spaces marked G in the picture areas B and D indicate the color record of the green square taken through a green color filter, and the dark spaces in said picture areas indicate that no light rays from the red square passed to the negative through the green color filters.

The drawings diagrammatically illustrate a form of apparatus for the projection of color films. 1 designates a film gate, 2 and 3 picture apertures. 4 designates a film strip passing through the gate 1, said film being intermittently advanced the distance of one picture area by the intermittent sprocket 5. 6 is a reflecting mirror which diverts the light rays 7 passing through 2 in the direction of another mirror 8, which in turn reflects the light rays through the objective lens 9, then through a double rotary color filter disk 10, to the viewing screen 11. The light rays 12 from the picture aperture 3 pass through an objective lens 13 and then through the color filter 10 to the viewing screen.

The double rotary color filter disk 10 is provided with eight color screens, the various colors red, orange, blue, and green being designated by the letters R, O, B and G and R', O', B' and G' respectively. The color filters R', O', B' and G' preferably, are of a darker shade than R, O, B and G. The color screens are separated by the opaque shutter and flicker sections S and S' and F and F' respectively. This rotary color filter disk is arranged and timed with the projector mechanism so that it will make one complete revolution during the advancement of two single picture areas. The color filters are arranged in two concentric circles. The outside circle of color filters R, O, B and G are arranged to pass the light rays passing through lens 13, and the inside circle of color filters R', O', B' and G' are arranged to pass the light rays passing through lens 9. The shutter sections S and S' are timed to shut off the light rays from the viewing screen during the advance movements of the film; and the flicker opaque sections F and F' are adapted to even the gap between light and darkness, caused by the opaque shutter sections S and S'. The color filter disk is divided into two half sections Y and Z, section Y passing the light rays during the exhibition of and change from one group of color pictures, and section Z passing the light rays during the exhibition of and change from the following group of color pictures.

In one method of carrying out my invention as applied to color motion picture projection I first produce, by any well known method, a suitable strip of negative film composed of groups of selective color images, by means of a motion picture camera employing a red and green color filter, one image being taken through the red portion of the filter and the next adjacent image through the green portion of the filter. From such a negative, a positive print is made as shown at 4 in the drawings which illustrate a strip of positive film comprising a series of groups of alternating two color photographic records of a red and a green square. In the group X is shown the contrast between the image taken through the red filter, and the image taken through the green filter. In the picture area C it will be seen that where the red square R is situated, the film emulsion is left perfectly clear or transparent, while the green square is opaque, so that, when C is projected through the red-orange filter, light rays can pass only through the clear square R. Likewise in B it will be seen, that where the green square G is situated, the film emulsion is left perfectly clear, while the red square is opaque, so that when projected through the blue-green filter, light rays can only pass through the clear square G.

In the ordinary methods of projecting a positive strip such as shown in the drawings, whereby the illusion of color is obtained entirely by the rapid projection of these varying groups of color selective images, the recurring changes from light to darkness, in the alternate color records, are the means of producing the objectionable pulsation. To overcome and eliminate this objectionable feature, I instead of projecting each color image separately as heretofore practiced, project them in pairs simultaneously through a rotating color filter so that each color selective image is projected through two or more colors, corresponding to the color value of each image, and are so arranged that each pair of color selective images are superimposed upon the viewing screen.

I am aware of the fact that there are various methods of double projection, but, in previous methods of double projection, two separate films or a double length film is used. Where two separate films are involved, two separate film advancing mechanisms are necessary, and where heretofore a double length film has been used in double projection methods, the film advancing mechanism was arranged to advance the film through the projection machine, two picture areas at a time. From the above, it will be seen that although the desired effect of eliminating color pulsation is accomplished, other objectionable features, such as, special projection apparatus and double the quantity of film are introduced, besides the necessity for skillful and accurate registering of the two images owing to their being projected in equal brilliancy.

By my method of double projection, I employ a single film strip upon which alternate color records have been photographed at the standard speed of sixteen pictures per second. This film strip is advanced through the projection mechanism one picture area at a time, but, two picture areas are exhibited at the same time, during the stationary period of the film in such a manner that each picture area is actually exhibited twice in succession. This is accomplished by the following method:

The film strip 4 is placed in the film aperture gate 1, so that the two color picture areas B and C, Fig. 1 are correctly in the frame of the two picture apertures 3 and 2, the end of the film being passed under the film advancing intermittent sprocket 5.

The projection light is evenly distributed over the two picture apertures 2 and 3. The light rays 7 passing through 2, are diverted by the reflecting mirror 6 toward the second mirror 8, which is arranged to direct the light rays through the objective lens 9 and through the color screen 10 to the viewing screen. The light rays 12 passing through aperture 3 pass directly through the objective lens 13, through the rotary color filter screen 10 to the viewing screen. Either 9 or 13 will be arranged with suitable adjustments, so that the projected image from one color record can be accurately superimposed on the viewing screen, upon the projected image of the other color record.

While the film is held in this stationary position, with the red picture record at 2 and the green picture record at 3, the rotary color filter disk 10 is revolved so that the color filters R' and O' in the Z section pass in front of the objective lens 9, and the other color filters B and G in the Z section of the color filter pass in front of the objective lens 13.

As shown in Fig. 1 the movement of the rotating color filter is so timed that when the red color record of the positive film is in register with the picture aperture 2 the rays of light passing through the said red color record will be projected by the lens 9 through the color filter O' to the viewing screen. This color record is indicated on the viewing screen 11 by the letter R and the color value of said record is indicated by the letter O'. The green color record of the positive film is in register with the picture aperture 3 and the light rays passing through said color record are projected by the lens 13 through the color filter section G to the viewing screen. The green color record is indicated on the viewing screen at G and the color value of the projected picture is indicated by the letter G. The color filter section O' is dark orange and the color filter section G is light green. The result of this is that the picture projected through the color filter O' will be subdued and subordinated to the more intensely lighted picture projected through the light green color filter G. The color filter rotates in the direction indicated by the arrows in the drawings and the flicker blade F' will for an instant interrupt the light rays. After the passage of the flicked blade the light rays from the lens 9 will pass through the dark red filter section R' and the light rays from the lens 13 will pass through the blue filter section B. This position of the color filter is indicated in Fig. 2. The red color record in Fig. 2 is designated on the viewing screen by the letter R and the color value thereof is indicated by the letter R'. The green color record is indicated on the viewing screen by the letter G and the color value thereof is indicated by the letter B. In this position of the color filter the red picture will still be subordinate to the more intensely lighted green picture.

Thus, during the projection of the red and green picture areas, four colored lights are passed over the viewing screen. The opaque square in the C picture area will prevent the orange and red light rays from reaching the viewing screen at the position held by the green square projected through the transparent square G in the B picture area while said rays are permitted to pass freely through the transparent section occupied by the red square R in C. Likewise, the opaque square in the B picture area prevents the blue and green light rays from reaching the viewing screen at the position held by the red square R in the C area, but said blue and green rays are permitted to pass freely through the transparent section occupied by the green square G in B.

In this manner, the red and the green squares are distinctly viewed at precisely the same time, without the illusion of superimposition, the two color images being actually superimposed together on the viewing screen, thereby eliminating the pulsation caused by the changes from light to dark as in the optical illusion methods.

The film is then advanced the distance of one picture area by the film advancing intermittent sprocket. During this advance movement of the film the opaque shutter section S′ passes before the light rays so as to effectually conceal the movement of the film. These changed positions of the film and color filter are shown in Fig. 3. After the film has been advanced one picture area, it will be seen that the position previously held by the picture area B is now occupied by the picture area C, and the position previously held by the picture area C is now held by the picture area D. At the same time the rotary color filter disk has changed its position so that during the stationary period of the picture areas C and D, the Y section of the color filter passes in front of the projection light rays.

By the film advancing one picture area, it will be seen that where a red picture record at first occupied the position at 2, it is now occupied by a green picture record. Likewise, where a green picture record at first occupied the position at 3 it is now occupied by a red picture record. At the same time, it will be noted, that the color filters have also changed their positions, for, whereas in the first position of the film (Figs. 1 and 2) the light rays passing through the objective lens 9 were transmitted through red and orange filters, they are now (Figs. 3 and 4) transmitted through blue and green filters, B′ and G′, while at the same time, the color filters R and O in Y pass the objective lens 13.

In the positions of the film and the rotating color filter shown in Fig. 3 the green color record D is in register with the picture aperture 2 and the rays of light passing through the said green color record will be projected by the lens 9 through the color filter G′ to the viewing screen. This color record is indicated on the viewing screen 11 by the letter G and the color value of said record is indicated by the letter G′. The red color record C has been advanced one picture area and is in register with the picture aperture 3 so that the light rays passing through said color record are now projected by the lens 13 through the color filter section O to the viewing screen. The red color record is indicated on the viewing screen by the letter R and the color value of the projected picture is indicated by the letter O. The color filter section G′ is dark green and the color filter section O is light orange. The result of this is that the picture projected through the color filter G′ will be subdued and subordinate to the more intensely lighted picture projected through the light orange filter O so that the red picture dominates on the screen and the green picture is subdued and subordinated. In Figs. 1 and 2 the green picture is the dominating picture. When, however, a red picture record is moved into its second position of exposure or projection it becomes the dominating picture and the green picture record which has been advanced to its first position of exposure becomes the subordinated picture. It is clear therefore that each color record in its first position of exposure or projection is subordinated and subdued and that as each picture or color record is advanced to its second position of exposure or projection it becomes the dominating picture by being more intensely lighted than when it was in its first position of exposure. This increasing intensity of lighting may be obtained by various shades of color filters or by any other suitable means. In the drawings the dominating picture on the viewing screen is illustrated by heavy lines. I prefer to subdue and subordinate each picture in its first position of its exposure, but it is manifest that the first position picture may be made the dominating picture on the screen if desired.

In the position of the parts shown in Fig. 4 the film has remained stationary and the flicker blade F has passed the projection lenses bringing the color filter B′ and R in the path of the rays projected by the lenses 9 and 13. The rays from the lens 9 will pass through the dark blue color filter B′ and the rays from the lens 13 will pass through the red color filter section R. The red picture is indicated on the viewing screen by the letter R and the color value thereof is indicated by the letter R. The green color record is indicated on the viewing screen by the letter G and the color filter thereof is indicated by the letter B′. In this position of the color filter the red color record will still be the dominant picture and more intensely lighted than the green picture.

When the shutter blade S again passes across the path of projection and interrupts the light rays from the lenses 9 and 13 the film will be again advanced one picture area. This will bring the green color record D into its second position of exposure and a new red color record E will be brought into its first position of its exposure. The color records are now in the positions indicated in Fig. 1 and the color filter also will have returned to the positions shown in Fig. 1. The entire length of film is advanced step-by-step one picture area at a time through the projecting apparatus, as hereinbefore described, each picture being projected twice, once with the preceding picture and once with the following picture.

The illusion of motion is accurately maintained owing to the fact that the images when projected through the objective lens 9 are slightly more subdued in color than when projected through the objective lens 13. By this method of double projection the changes from light to darkness, in the alternating color records, cannot be observed on the viewing screen. This removes the cause of color pulsation and of course removes the cause of severe eye strain due to color pulsation.

One of the advantages of using the darker shade of color filters R′, O′, B′ and G′ is that it minimizes the degree of accuracy necessary in superimposing the two images on the viewing screen. Any slight inaccuracy of register of the two images will not be observed. Another advantage is that in most motion pictures the subject photographed is moving and therefore the successive images on the film cannot be, with absolute accuracy, superimposed on the screen and by subordinating one of said images the slight inaccuracy of register cannot be noted. If, however, the two color records or images were to be projected on the viewing screen in equal brilliancy a slight overlapping of parts of the images might appear and this might result in what is known as color lapping or color fringing. This possibility of fringing of color is eliminated by subduing one of the images while still maintaining sufficient brilliancy of projection of the dominating picture to effectually remove color pulsation.

Where in this disclosure I have referred to the color filter disk as being composed of red, orange, blue and green color filters, I do not bind myself to these particular colors or to any particular shade, density or number of colors, or to any particular circumferential length of each color. Also, where in this disclosure I have preferred to use darker shades of color filters in R′, O′, B′ and G′, I could, if desired, have these colors light and R, O, B and G dark, but, inasmuch as there will already be a certain percentage of light lost in the reflecting mirrors, it is only natural that I should adopt the method described; I may also use just two color filters, red and green, but a better rendering of color is obtained by using a plurality of colors.

In the foregoing specification, I have, for the purpose of simplifying the description of the method refrained from unnecessary details of the optical and mechanical construction, the drawings merely being illustrative of its application.

What I claim is:

1. The method of projecting motion pictures in colors from a positive film having a series of successive pictures arranged thereon in alternating color selective images, consisting in projecting the color selective images in pairs simultaneously, superimposing said simultaneously projected pictures on the viewing screen, moving the film through the projection mechanism one picture area at a time whereby each image will be projected twice on the screen, once with the preceding image and once with the following image, providing orange, red, green and blue color screens, and changing said screens to correspond with the changes in the color selective images in the projecting mechanism, whereby each image of one selective color will be projected twice through orange and red screens and each image of another selective color will be projected twice through green and blue screens.

2. The method of projecting motion pictures in colors from a positive film having a series of successive pictures arranged thereon in alternating color selective images, consisting in projecting the color selective images in pairs simultaneously, superimposing said simultaneously projected pictures on the viewing screen, moving the film through the projection mechanism one picture area at a time whereby each image will be projected twice on the screen, once with the preceding image and once with the following image, providing two sets of orange, red, green and blue color screens of different opacity, and changing said screens to correspond with the changes in the color selective images in the projecting mechanism whereby each image of one selective color will be projected twice through both orange and red screens and each image of another selective color will be projected twice through both green and blue screens, the successive projections of each image differing in intensity by reason of the difference in opacity of the two sets of screens.

3. The method of projecting motion pictures in colors from a positive film having the pictures arranged thereon in alternating color selective images, consisting in projecting the color selective images simultaneously and separately through independent color screens of different opacity, superimposing said simultaneously projected pictures on the viewing screen, and moving the film through the projection mechanism one picture at a time whereby each image will be projected twice on said screen, once with the preceding image and once with the following image, the difference in opacity of the screens causing a difference in the intensity of the said two projections of each image.

In testimony whereof I hereunto affix my signature.

FREDERICK T. O'GRADY.